United States Patent [19]

Utsumi et al.

[11] Patent Number: 5,139,727

[45] Date of Patent: Aug. 18, 1992

[54] PROCESS FOR PRODUCING BIAXIALLY ORIENTED POLYESTER FILM

[75] Inventors: Shigeo Utsumi, Yamato; Kichinojyo Tomitaka, Yokohama; Yujiro Fukuda, Machida; Takatoshi Miki, Nagahama, all of Japan

[73] Assignee: Daifoil Company, Limited

[21] Appl. No.: 734,063

[22] Filed: Jul. 22, 1991

Related U.S. Application Data

[63] Continuation of Ser. No. 432,979, Nov. 7, 1989, abandoned.

[30] Foreign Application Priority Data

Nov. 11, 1988 [JP] Japan .................. 63-284863

[51] Int. Cl.$^5$ ................................ B29C 55/14
[52] U.S. Cl. ................... 264/210.7; 264/235.8; 264/290.2
[58] Field of Search ............... 264/210.7, 235.8, 290.2

[56] References Cited

U.S. PATENT DOCUMENTS 4,059,667 11/1977 Pangonis .
4,370,291 1/1983 Kazama et al. .................. 264/210.7

FOREIGN PATENT DOCUMENTS 2302837 10/1976 France .
58-78729 5/1983 Japan .................. 264/290.2
60-228123 11/1985 Japan .................. 264/210.7
1430291 3/1976 United Kingdom .

OTHER PUBLICATIONS

English Translation of Japanese Reference (Kokai) 58-78,729 (Published May 1983).
English Translation of Japanese Reference (Kokai) 60-228,123 (Published Nov. 1985).
Abstract of Japanese Reference (Kokai) 54-8,672 (Jan. 1979).
Abstract of Japanese Reference (Kokai) 58-118,220 (Jul. 1983).
Database WPIL No. 86-327982 (50), Derwent Abstract.
Database WPI, No. 78-12792A (07) Derwent Abstract.
Database WPIL, No. 83-28573K (12), Derwent Abstract.

*Primary Examiner*—Leo B. Tentoni
*Attorney, Agent, or Firm*—David G. Conlin; David S. Resnick

[57] ABSTRACT

The present invention relates to a process for producing a biaxially oriented polyester film. The process is carried out using the following steps: (a) stretching an amorphous film substantially comprising polyethylene terephthalate 1.2 to 4.0 times in the machine direction by single-stage or multi-stage process to obtain a film having an index of birefringence of $1 \times 10^{-3}$ to $2.5 \times 10^{-2}$; (b) stretching the thus obtained film 1.1 to 3.5 times in the machine direction by single-stage or multi-stage process of $3.0 \times 10^{-2}$ to $8.0 \times 10^{-2}$ without cooling the film to the glass transition temperature thereof or below; (c) cooling the thus obtained film to the glass transition temperature thereof or below; (d) heating the thus obtained film to the glass transition temperature or higher and stretching the film in the machine direction by a single-stage or multi-stage process at a stretching ratio which brings the overall stretching ratio of 4.0 to 9.0 times; and (e) stretching the thus obtained film at least 3.2 times in the transverse direction. According to the method of the present invention, a biaxially oriented polyester film which is excellent in thickness uniformity and flat and slippery properties can be easily produced and high-speed production thereof is possible, therefore, the present invention has a great industrial value.

6 Claims, 1 Drawing Sheet

PROCESS FOR PRODUCING BIAXIALLY ORIENTED POLYESTER FILM

This is a continuation of copending application Ser. No. 07/432,979, filed on Nov. 7, 1989, now abandoned.

BACKGROUND OF THE INVENTION

The present invention relates to a process for producing a biaxially oriented polyester film excellent in thickness uniformity as well as in flat and slippery properties.

Oriented polyester film is produced by stretching an amorphous polyester film in machine direction and/or longitudinal direction. And oriented polyester film is provided with mechanical properties according to their application purposes by suitable selection of production conditions for desired film.

However, it has been difficult to prepare a film having desired properties simultaneously because obtaining some preferred properties will inevitably sacrifice other properties and/or productivities to some extent. Above all, thickness uniformity and flat and slippery properties are primary characteristics required for a film, therefore, a variety of attempts have been made for providing the film with all these properties simultaneously, but with unsatisfactory results hitherto.

Considering these problems, the present inventors, as the result of earnest investigations, found that a film excellent in both thickness uniformity and flat and slippery properties can be easily prepared by effecting machine direction stretching at a specific condition, and have eventually completed the present invention based on this finding.

SUMMARY OF THE INVENTION

In an aspect of the present invention, there is provided a process for producing a biaxially oriented polyester film, which comprises the steps of, (a) stretching an amorphous film substantially comprising polyethylene terephthalate 1.2 to 4.0 times in the machine direction by single-stage or multi-stage process to obtain a film having an index of birefringence of $1 \times 10^{-3}$ to $2.5 \times 10^{-2}$.

(b) stretching the thus obtained film 1.1 to 3.5 times in the machine direction by single-stage or multi-stage process without cooling the film to the glass transition temperature thereof or below to obtain a film having an index of birefringence of $3.0 \times 10^{-2}$ to $8.0 \times 10^{-2}$, (c) cooling the thus obtained film to the glass transition temperature thereof or below, (d) heating the thus obtained film to the glass transition temperature or higher and stretching the film in the machine direction by single-stage or multi-stage process at a stretching ratio which brings the overall stretching ratio of 4.0 to 9.0 times, and (e) stretching the thus obtained film at least 3.2 times in the transverse direction.

DETAILED DESCRIPTION OF THE INVENTION

Figure 1:
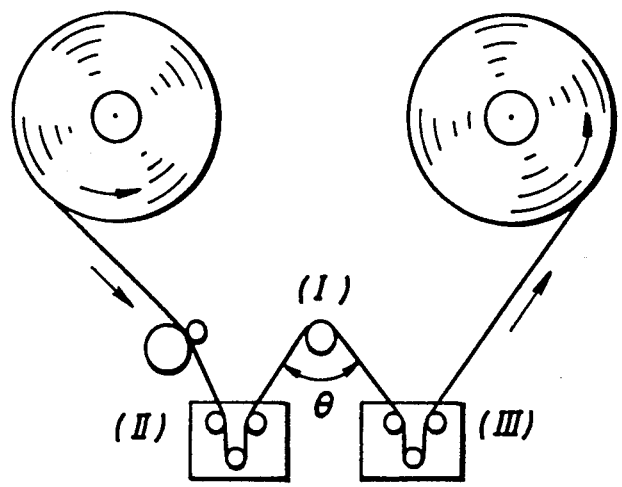
FIG. 1 illustrates a tape running system for evaluating the coefficient of kinetic friction against metals. (I): 6 m/m$\phi$ SUS-420-J2 fixed pin; (II): inlet tension meter; (III): outlet tension meter; $\theta = 135°$.

Polyester employed in the present invention is polyethylene terephthalate (hereinafter referred to as "PET") having an intrinsic viscosity of 0.4 to 0.9 and in which not less than 80 wt % of the acid component is terephthalic acid unit and not less than 80 wt % of the glycol component is ethylene glycol unit.

As the other acid components, one or more units derived from oxalic acid, malonic acid, succinic acid, adipic acid, azelaic acid, sebacic acid, phthalic acid, isophthalic acid, naphthalenedicarboxylic acid, diphenyl ether dicarboxylic acid, etc. may be used.

As the other glycol components, one or more units derived from propylene glycol, trimethylene glycol, tetramethylene glycol, hexamethylene glycol, diethylene glycol, triethylene glycol, polyalkylene glycol, 1,4-cyclohexane dimethanol, neopentyl glycol, etc. may be used.

In addition, hydroxycarboxylic acid such as p-hydroxybenzoic acid, benzoic acid, benzoylbenzoic acid, mono functional compound such as methoxypolyalkylene glycol and poly functional compound such as glycerol, pentaerythritol, etc. may be also used as the components of PET.

Further, a polymer blend obtained by adding other polymers to PET in such an amount as not impairing the advantageous effect of the present invention can be also used. As polymers to be added to PET, nylons polypropylene, polyethylene, ethylene oxide-propylene oxide copolymer, etc. may be mentioned.

The polymers or the polymer blend to be used may contain phosphoric acid, phosphorous acid and the esters thereof as well as inorganic particles such as silica, kaolin, calcium carbonate, calcium phosphate, titanium dioxide etc. These may be contained during polymerization step or added after polymerization step. The contents of these acids, esters and inorganic particles range from 0.001 to 10.0 wt % based on polymers or polymer blends.

In the following, a method for producing the film will be described. After thoroughly drying PET or a polymer blend, using an extruder kept at temperatures, e.g., ranging from 280° to 290° C., it is melt-molded into a sheet through the die of the extruder after filtration by a filter, then cast onto a rotating cooling drum to produce solidified film by cooling. Thus obtained solidified film (hereinafter referred to as "film A") is substantially in an amorphous state.

Then the film A is preheated to at least 100° C., preferably to a temperature of 100° to 130° C., and is subjected to the first stretching so as to have an index of birefringence ($\Delta n$) of from $1.0 \times 10^3$ to $2.5 \times 10^{-2}$ (hereinafter thus obtained film is referred to as "film B-1"). Depending on preheating temperature, the first stretching ratio which allows $\Delta n$ to be in said range is in the range of 1.2 to 4.0 times, preferably in the range of 1.2 to 3.5 times the original length, and the ratio can be easily determined by pretesting. When the $\Delta n$ of film B-1 is less than $1.0 \times 10^{-3}$, the final film will have poor thickness uniformity and B-1 film is not capable of being subjected to machine stretching in high ratio even in the case where subsequent steps are adequately conducted. And when $\Delta n$ is more than $2.5 \times 10^{-2}$, film B-1 is unpreferably produced with less stability because frequent breaks of the film will occur during transverse stretching due to the significant progress of crystallization in subsequent steps. The $\Delta n$ of the film B-1 is preferably in the range of $1.0 \times 10^{-3}$ to $1.0 \times 10^{-2}$.

As for the number of stretching stages at the first stretching step, single-stage is available, needless to say, multi-stages of two or more stages are also available.

Depending on stretching ratio, the first stretching is generally carried out by 1 to 4 stages, preferably 1 to 3 stages. It is preferred that the starting point of each stretching in the first stretching step is formed by a driving tack-free roller and a tack-free nip roller, and it is also preferred that the temperature of the film is kept at a temperature higher than its glass transition point preferably 80° to 130° C.

Thus prepared film B-1 is subjected to the second stretching by single- or multi-stage process without cooling it to the glass transition point thereof or less and adjusting the stretching ratio to be in the range of 1.1 to 3.5 so that the index of birefringence ($\Delta n$) thereof becomes in the range of $3.0 \times 10^{-2}$ to $8.0 \times 10^{-2}$ (hereinafter thus obtained film is referred to as "film B-2").

In the second stretching, the temperature of the film is generally in the range of 100° to 130° C.

When the temperature of the film is less than 100° C., the thickness uniformity of the final film can not be improved. While, when the temperature is more than 130° C., the final film will be unsuitably provided with roughened surface and film B-2 has a poor transverse stretching properties due to the progress of crystallization of the film. When the $\Delta n$ of film B-2 is less than $3.0 \times 10^{-2}$, the final film will unsuitably have unimproved thickness uniformity, and when the $\Delta n$ is more than $8.0 \times 10^{-2}$, film B-2 is so high in the crystallinity that insufficient improvement in thickness uniformity and impaired transverse stretching properties are unpreferably provided. The range of the $\Delta n$ of film B-2 is preferably $3.0 \times 10^{-2}$ to $6.0 \times 10^{-2}$, more preferably $4.0 \times 10^{-2}$ to $5.5 \times 10^{-2}$. It is preferable that the average refractive index ($\bar{n}$) of the resulted film is in the range of 1.570 to 1.600. When the index is less than 1.570, undesirably the thickness uniformity of the film can not be improved in spite of its machine stretching in the following step. While when the index is more than 1.600, unpreferably its transverse stretching properties are extremely degraded.

Depending on the second stretching ratio, the number of stretching stages the second stretching is usually carried out by 1 to 3 stages, preferably only one stage.

It is necessary for thus resulted film B-2 to be then cooled to the glass transition temperature thereof or less, preferably 10° to 79° C. When film B-2 is supplied to the next step without cooling it to the glass transition point thereof or less, unpreferably the thickness uniformity of the final film will not be improved.

The film after such cooling step is heated again to the glass transition temperature thereof or more, preferably to a temperature of 80° to 120° C., and subjected to the third stretching in the machine direction at a stretching ratio which brings an overall stretching ratio ((first stretching ratio)×(second stretching ratio)×(third stretching ratio)) of 4 to 9 times of the original length (hereinafter thus prepared film referred to as "film B-3"). When an overall stretch-ratio of the film is less than 4.0 times, it is too small to meet the object of the present invention. And when more than 9.0 times, the crystallization of the film at its both edges will extremely progress, and the film tends to become tearable in the machine direction, therefore, unpreferably causing difficult transverse stretching. When overall stretch-ratio is in the range of 4 to 9 times, the number of stretching stages of the third stretching step are not necessarily restricted, but the stretching is generally carried out by 1 to 3 stages. In the case of manufacturing so-called balanced type film, it is preferable for the index of birefringence of the film after the third stretching to be in the range of 0.040 to 0.060. For a further tensilized film, the index of birefringence is in the range of more than 0.060 and not more than 0.120.

A biaxially oriented film can be produced by stretching film B-3 in the transverse direction with a stretching ratio of at least 3.2 times, preferably 3.5 to 5.0 times.

The transverse stretching temperature generally ranges from 100° to 140° C. Thus obtained biaxially oriented film may be directly heat-treated at a temperature of 130° to 250° C. for 0.1 to 60 sec, or after stretching again the film in the machine direction and/or the transverse direction 1.2–3.0 times at a temperature of 80° to 160° C., it may be heat-treated.

The films prepared according to the present invention are superior flat and slippery properties and thickness uniformity in comparison with a film having the same stretching strength such as tensile strength, $F_5$ value and Young modulus as those of the present film, and being prepared by using the same materials as those used in the present invention as well as by using conventional stretching method. Also, when manufacturing a high-strength film, a film having excellent thickness uniformity and flat and slippery properties can be produced, and also, break of the film can be remarkably decreased. In addition, the process according to the present invention enables to stretch a film in a higher stretching ratio, which can greatly contribute to increased production capability leading to lowering in cost. Further, the film has excellent transverse stretching properties as well as little breakings, which also serve to the improvement of its productivity.

The thickness uniformity in the machine direction of the biaxially oriented polyester film according to the present invention is not more than 5%, preferably not more than 4%.

As for flat and slippery properties, the biaxially oriented polyester film according to the present invention satisfies the following relation (I):

$$(\mu d - 0.005) \times (Ra - 0.22) < 0.00035 \quad \text{(I)}$$

preferably the following relation (II):

$$(\mu d - 0.005) \times (Ra - 0.22) < 0.00030 \quad \text{(II)}$$

wherein $\mu d$ is kinetic friction coefficient against metal and Ra is surface roughness ($\mu m$).

The biaxially oriented polyester film according to the present invention is preferably used for packaging film as well as for base film for magnetic recording media such as magnetic tape etc., and for electric insulation base film for condenser etc.

The process according to the present invention is particularly preferably applied for the production of a film having a thickness of 0.5 to 50 $\mu m$.

Hereinafter, this invention will be more particularly illustrated with reference to examples, however, it is not intended to be limited only to the specific embodiments.

In the following Examples and Comparative Examples, the measurements of properties of films are carried out in accordance with each method shown below.

(1) Thickness uniformity

The thickness of a biaxially oriented film was measured in each direction of the machine direction and the transverse direction throughout the length of 3 m by using a continuous film thickness meter (equipped with an electronic micrometer) produced by Anritsu-Denki Co.

Thickness uniformity in each of the machine direction and the transverse direction is calculated by the following equation.

Thickness uniformity (%) =

$$\frac{(maximum\ thickness) - (minimum\ thickness)}{average\ thickness} \times 100$$

(2) Coefficient of kinetic friction ($\mu d$) against metal

By using the apparatus shown in FIG. 1, a film was contacted with a fixed hard chrome-plated metal roll (6 mm in diameter) at a winding angle ($\theta$) of 135°, and with a load ($T_2$) of 53 g applied to one end, the film was let run at a speed of 1 m/min. The resisting force ($T_1$ (g)) at the other end was measured, and the coefficient of friction ($\mu d$) in running of the film was determined from the following formula:

$$\mu d = \frac{1}{\theta} \ln\left(\frac{T_1}{T_2}\right) = 0.424 \ln\left(\frac{T_1}{53}\right)$$

(3) Surface roughness (Ra)

Surface roughness was represented by the average center line surface roughness Ra ($\mu$m). Ra was determined in the following way by using a surface roughness meter (SE-3FK) made by Kosaka Kenkyusho Co., Ltd. From the film surface roughness curve (sectional curve of film) a portion with a standard length L (2.5 mm) in the direction of center line was taken out. Expressing the roughness curve as y=f(x) with the center line of the portion taken out representing the X axis and the direction vertical to the center line representing the Y axis, the value given from the following formula was presented as Ra ($\mu$m):

$$Ra = \frac{1}{L} \int_0^L |f(x)| dx$$

The radius of the end of the needle was 2 $\mu$m, the load was 30 mg, and cut-off value was 80 $\mu$m. Ra shown here is the average of the measurements at total 10 points, 5 points in the machine direction and 5 points in the transverse direction.

EXAMPLE 1

After drying polyethylene terephthalate chips having an intrinsic viscosity of 0.60 and containing 0.3 wt % of $Al_2O_3$ with an average diameter of 0.02 $\mu$m and 0.3 wt % of calcium carbonate with an average diameter of 0.7 $\mu$m at 180° C. for 5 hours, the chips were extruded into a sheet from a T-die at 285° C., then the sheet was solidified by cooling on a rotating drum kept at 45° C. to produce an unoriented amorphous film with a width of 350 mm. At this time a well-known electrostatic pinning method was employed.

By using the circumferential velocity differential of multi-stage nip rollers, the resulted unstretched amorphous film was stretched 1.6 times in the machine direction at a film temperature of 112° C. as the first stretching, and successively stretched 2.8 times in the machine direction at a film temperature of 110° C. as the second stretching.

The index of birefringence of the film after the first stretching was $3.0 \times 10^{-3}$, and was $4.2 \times 10^{-2}$ after the second stretching.

Thus produced film was once cooled down to 40° C., and then heated up to 98° C. to stretch the film 1.2 times in the machine direction as the third stretching.

The index of birefringence $\Delta n$ of the film after the third stretching was 0.060.

Then in a tenter the film was stretched 3.8 times in the transverse direction at 110° C., and then subjected to heat setting being held under restraint at 215° C. for 6 sec to obtain a film having a final thickness of 15 $\mu$m. The property values thereof are shown in Table 1.

EXAMPLE 2

In the same manner as in Example 1 except that an unoriented amorphous film was stretched 2.1 times at 110° C. in the first stretching and 2.2 times in the second stretching, a biaxially oriented film was obtained. The properties thereof are shown in Table 1.

EXAMPLE 3

In the same manner as in Example 1 except that an unoriented amorphous film was stretched 3.0 times at 110° C. as the first stretching, 1.7 times in the second stretching and 1.07 times in the third stretching, a biaxially oriented film was obtained. The properties thereof are shown in Table 1.

EXAMPLES 4 AND 5

In the same manner as in Example 1 except that the temperature of the third stretching was set at a temperature of 83° C. and the third stretching ratio were changed to be 1.3 and 1.5 times respectively, two films having a thickness of 9 $\mu$m were obtained. The properties thereof are shown in Table 1.

COMPARATIVE EXAMPLES 1 AND 2

In the same manner as in Example 2 except that the third stretching was eliminated and the second stretching ratios were changed to be 2.3 and 2.4 times respectively, two films with a thickness of 15 $\mu$m and 9 $\mu$m were obtained. These films were extremely poor in the transverse stretching properties compared with those of the EXAMPLES.

COMPARATIVE EXAMPLE 3

In the same manner as in Comparative Example 1 except that the second stretching was eliminated and the first stretching was effected at 83° C. with a stretching ratio of 3.7 times, a film having 15 $\mu$m in the thickness was produced. The properties thereof are shown in Table 1.

TABLE 1

| | Machine direction stretching ratio | | | | Index of birefringence (Δn) after each stretching | | | Machine direction thickness uniformity (%) | Surface roughness Ra (μm) | Kinetic coefficient of friction between film and metal pin |
|---|---|---|---|---|---|---|---|---|---|---|
| | 1st stretching ratio | 2nd stretching ratio | 3rd stretching ratio | Overall stretching ratio | After 1st stretching | After 2nd stretching | After 3rd stretching | | | |
| Example 1 | 1.6 | 2.8 | 1.2 | 5.38 | 0.003 | 0.042 | 0.060 | 3.0 | 0.013 | 0.24 |
| Example 2 | 2.1 | 2.2 | 1.2 | 5.54 | 0.008 | 0.042 | 0.060 | 3.5 | 0.013 | 0.25 |
| Example 3 | 3.0 | 1.7 | 1.07 | 5.46 | 0.023 | 0.052 | 0.060 | 3.3 | 0.013 | 0.24 |
| Example 4 | 2.1 | 2.2 | 1.3 | 6.01 | 0.008 | 0.042 | 0.085 | 2.6 | 0.012 | 0.26 |
| Example 5 | 2.1 | 2.2 | 1.5 | 6.93 | 0.008 | 0.042 | 0.105 | 2.3 | 0.010 | 0.27 |
| Comparative Example 1 | 2.1 | 2.3 | — | 4.83 | 0.008 | 0.060 | — | 6.0 | 0.015 | 0.26 |
| Comparative Example 2 | 2.1 | 2.4 | — | 5.04 | 0.008 | 0.085 | — | 10.0 | 0.016 | 0.28 |
| Comparative Example 3 | 3.7 | — | — | 3.70 | 0.105 | — | — | 5.0 | 0.018 | 0.32 |

What is claimed is:

1. A process for producing a biaxially oriented polyester film, which comprises the sequential steps of,
   (a) stretching an amorphous film substantially comprising polyethylene terephthalate 1.2 to 4.0 times in the machine direction in one or more stages to obtain a film having an index of birefringence of $1 \times 10^{-3}$ to $2.5 \times 10^{-2}$,
   (b) stretching the thus obtained film 1.1 to 3.5 times in the machine direction in one or more stages while keeping the film at a temperature above the glass transition temperature thereof to obtain a film having an index of birefringence of $3.0 \times 10^{-2}$ to $8.0 \times 10^{-2}$,
   (c) cooling the thus obtained film to a temperature in a range from the glass transition temperature thereof to a temperature below the glass transition temperature,
   (d) heating the thus obtained film to a temperature in a range from the glass transition temperature to a temperature above the glass transition temperature and stretching the film in the machine direction in one or more stages at a stretching ratio which results in the film having an overall stretching ratio of 4.0 to 9.0 times, and
   (e) stretching the thus obtained film at least 3.2 times in the transverse direction.

2. A process according to claim 1, wherein said biaxially oriented film is further heat-treated at 130°-250° C. for 0.1 to 60 seconds.

3. A process according to claim 1, wherein the first stretching temperature is in the range of 100° to 130° C.

4. A process according to claim 1, wherein the second stretching temperature is in the range of 100° to 130° C.

5. A process according to claim 1, wherein the third stretching temperature is in the range of 80° to 120° C.

6. A process according to claim 1, wherein the third stretching is conducted so as the index of birefringence of the resulted film to be in the range of 0.040 to 0.120.

* * * * *